US 7,772,307 B2

(12) United States Patent
Dai et al.

(10) Patent No.: US 7,772,307 B2
(45) Date of Patent: Aug. 10, 2010

(54) WATER DISPERSIBLE POLYISOCYANATE COMPOSITION AND ITS USES

(75) Inventors: Shenghong A. Dai, Taichung (TW); Chinghung Chen, Taiping (TW); Will Yang, Taichung (TW); Tsai-Lung Chen, Taichung (TW); Chien-Wen Chen, Taichung (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 0 days.

(21) Appl. No.: 12/077,537

(22) Filed: Mar. 19, 2008

(65) Prior Publication Data

US 2008/0221249 A1   Sep. 11, 2008

Related U.S. Application Data

(63) Continuation-in-part of application No. 10/724,923, filed on Dec. 1, 2003, now abandoned.

(30) Foreign Application Priority Data

Aug. 27, 2003   (TW) .............................. 92123595 A

(51) Int. Cl.
*C08L 75/04* (2006.01)
*C08K 5/07* (2006.01)
*C08K 5/101* (2006.01)

(52) U.S. Cl. ...................... 524/315; 524/361; 524/591; 525/452

(58) Field of Classification Search ................ 524/591, 524/315, 361; 525/452
See application file for complete search history.

(56) References Cited

U.S. PATENT DOCUMENTS

| | | | |
|---|---|---|---|
| 3,862,973 A * | 1/1975 | Dietrich et al. ............. 560/335 |
| 3,903,126 A | 9/1975 | Woerner et al. |
| 4,127,599 A * | 11/1978 | Mohring et al. ............. 560/335 |
| 4,147,714 A * | 4/1979 | Hetzel et al. ................ 560/335 |
| 4,152,350 A * | 5/1979 | Mohring et al. ............. 560/335 |
| 4,181,782 A * | 1/1980 | Mohring et al. ............. 521/162 |
| 4,518,522 A | 5/1985 | Markusch et al. |
| 4,618,706 A * | 10/1986 | Scholl et al. ................ 560/335 |
| 4,663,377 A | 5/1987 | Hombach et al. |
| 4,703,100 A * | 10/1987 | Rasshofer et al. ............. 528/66 |
| 4,816,600 A * | 3/1989 | Gillis, Jr. .................... 560/335 |
| 4,916,201 A * | 4/1990 | Harris et al. .................. 528/60 |
| 4,939,191 A | 7/1990 | Kataoka et al. |
| 5,104,959 A | 4/1992 | Hess |
| 5,200,489 A | 4/1993 | Jacobs et al. |
| 5,202,377 A | 4/1993 | Thorne et al. |
| 5,252,696 A | 10/1993 | Laas et al. |
| 5,350,825 A * | 9/1994 | Konig et al. ................... 528/45 |
| 5,367,017 A | 11/1994 | Rosthauser et al. |
| 5,961,878 A * | 10/1999 | Konig et al. ........... 252/182.21 |
| 5,994,491 A * | 11/1999 | Woynar et al. ................ 528/68 |
| 6,221,995 B1 | 4/2001 | Yukio et al. |
| 6,384,175 B1 * | 5/2002 | Danielmeier et al. .......... 528/73 |
| 6,414,184 B1 * | 7/2002 | Bruchmann et al. ......... 560/335 |
| 6,437,078 B1 | 8/2002 | Smith |
| 6,720,400 B2 * | 4/2004 | Halpaap et al. ............... 528/48 |
| 2001/0056169 A1 * | 12/2001 | Halpaap et al. ............... 528/48 |
| 2004/0019160 A1 * | 1/2004 | Dai et al. ..................... 525/457 |
| 2005/0049358 A1 * | 3/2005 | Dai et al. ..................... 524/589 |
| 2006/0089479 A1 * | 4/2006 | Venham et al. ............... 528/44 |
| 2006/0089480 A1 * | 4/2006 | Roesler et al. ................ 528/44 |

* cited by examiner

*Primary Examiner*—Marc S Zimmer
*Assistant Examiner*—Noah Frank
(74) *Attorney, Agent, or Firm*—Ladas & Parry LLP

(57) ABSTRACT

The present invention relates to a water dispersible polyisocyanate composition bearing urea comprising
  (a) an aliphatic polyisocyanate or a mixture of aliphatic polyisocyanates or a mixture of aliphatic polyisocyanates with other polyisocyanates; and
  (b) a reaction product of component (a) with component (c) a polyoxyalkylene amine or a mixture of a polyoxyalkylene amine and a polyoxyalkylene alcohol.

The present invention also relates to a water dispersible polyisocyanate composition bearing urea and urea derivatives which is obtained by heating the above composition bearing urea for conducting a subsequent reaction, to increase the numbers of isocyanate functional groups contained in said composition, wherein the urea derivatives include biuret, triuret and tetrauret, and most of them are biuret.

The present invention further relates to a water dispersible polyisocyanate composition bearing biuret which is obtained by heating the above composition bearing urea for conducting a subsequent reaction, to increase the numbers of isocyanate functional groups contained in said composition.

The present invention another relates to an aqueous resin adhesive which contains the water dispersible polyisocyanate composition of the present invention and an aqueous resin containing active hydrogen reactive groups.

14 Claims, No Drawings

WATER DISPERSIBLE POLYISOCYANATE COMPOSITION AND ITS USES

This application is a continuation-in-part of application Ser. No. 10/724,923 filed on Dec. 1, 2003 now abandoned claims the benefit thereof and incorporates the same by reference.

FIELD OF THE INVENTION

The present invention relates to a water dispersible polyisocyanate composition, particularly a water dispersible polyisocyanate composition bearing urea or biuret, and to an aqueous resin adhesive comprising such water dispersible polyisocyanate composition as a crosslinking agent and an aqueous resin containing active hydrogen reactive groups.

BACKGROUND OF THE INVENTION

Water dispersible polyisocyanates are commonly applied in the adhesives based on the aqueous resins as crosslinking agents. Particularly, the isocyanates are highly reactive to the compounds having active hydrogen groups so as to form, for example, urethane, urea, amide, allophanate, and biuret products. Thus, the polyisocyanates are advantageous to the molecular growth and crosslinking of the resins so as to extensively improve their adhesion, heat resistance, and mechanical performance when being used as adhesives. The characteristic of high reactivity of the polyisocyanates allows them to be an excellent crosslinking agent for the aqueous resins.

The preparations and applications of the water dispersible polyisocyanates are known and have been disclosed. For example, U.S. Pat. No. 4,663,377 discloses the utilization of one or more aliphatic polyisocyanates having an average NCO functionality of about 2.0 to 3.5, to react with hydrophilic materials of polyoxyalkylene monols, such as poly ethoxylated ether monol exemplified in the examples provided thereof. The obtained water dispersible polyisocyanate preparation has an NCO % of 18.4% and a viscosity of 2500 cps/23° C. The water dispersible polyisocyanate preparation in an amount of 2 wt % to 10 wt % is added to an aqueous adhesive so as to enhance the adhesive performance.

U.S. Pat. No. 5,200,489 relates to the use of a polyoxyalkylene monol to modify polyisocyanates based on 1,6-hexamethylene diisocyanate (HDI) or a mixture of HDI with up to 70% by weight, based on the weight of the diisocyanate, of another diisocyanate, to obtain a water dispersible polyisocyanate composition having an average NCO functionality of 2 to 6, and further provides a method for testing the water dispersibility of the polyisocyanate composition. The test results show that the polyoxyalkylene monol in an amount of about 10 wt % and having a molecular weight of 200 to 1000 g/mole is more favorable to improve the water dispersibility of the polyisocyanate composition.

U.S. Pat. No. 5,252,696 teaches a water dispersible polyisocyanate mixture obtained by reacting an aliphatic polyisocyanate having an NCO functionality of about 2.1 to 4.4, such as HDI trimer, with a polyoxyalkylene monol containing 5 to 9.9 ethylene oxide (EO) units, at an NCO/OH equivalent ratio of 4:1 to 120:1. One synthesis example relates to the addition of poly ethoxylated ether monol to HDI trimer for conducing reaction so as to obtain a product having an NCO % of 17.3% and a viscosity of 3050 cps/23° C. The obtained water dispersible polyisocyanate mixture is then added to an aqueous acrylic dispersant bearing a hydroxyl group, so as to provide good surface gloss and solvent resistance.

U.S. Pat. No. 6,221,995 discloses a modified polyisocyanate which has a high emulsifying/dispersing ability in an aqueous resin composition and can be advantageously used as a curing or crosslinking agent. The modified polyisocyanate is prepared by reacting an HDI-based isocyanurate group-containing polyisocyanate and a nonionic emulsifying agent, poly ethoxylated ether monol. U.S. Pat. No. 6,221,995 mentions that the hydrophilic structure of a polyoxyalkylene monol is expressed by a hydrophile-lipophile balance (HLB), and indicates that a water dispersible polyisocyanate synthesized from a polyoxyalkylene monol having a HLB of 17 or less (about 5 to 17) provides better performance when used in aqueous coatings, inks, and adhesives.

In view of the known technologies, the water dispersible polyisocyanates are normally prepared by reacting an aliphatic polyisocyanate based on HDI trimer with a nonionic polyoxyalkylene monol having a low molecular weight. Nonetheless, the reaction rate of a polyoxyalkylene alcohol with a polyisocyanate is slow and normally need to be accelerated by adding catalysts. Moreover, the water dispersible polyisocyanates of the prior art cannot immediately enhance the initial adhesion between rubbers and rubbers when being used in the adhesion of rubber substrates.

The inventors of the present invention have found that the reaction rate of polyoxyalkylene amines or mixtures of polyoxyalkylene amines and polyoxyalkylene alcohols with polyisocyanates is faster than that of polyoxyalkylene alcohols with polyisocyanates, which is advantageous to prepare water dispersible polyisocyanate compositions, especially water dispersible polyisocyanate compositions bearing urea or biuret. In addition, the water dispersible polyisocyanate composition of the present invention is more favorable for use in an aqueous resin as a crosslinking agent, compared with those prepared by the prior art technologies. Particularly, the aqueous resin adhesives crosslinked with the water dispersible polyisocyanate composition of the present invention have increased mechanical properties, such as adhesive ability, including the initial and aging adhesion, and heat resistance.

Although in view of the conventional technologies, the water dispersible polyisocyanates (WDPIs) are normally prepared by reacting an aliphatic polyisocyanate based on HDI trimer with a nonionic polyoxyalkylene monol and/or polyol, U.S. Pat. No. 5,202,377 discloses a WDPI made from an aliphatic polyisocyanate and a polyoxyalkylene monoamine. However, this kind of WDPI needs high boiling-point solvent (N-methyl pyrrolidone) to suppress the viscosity built up due to the formed urea linkages. This problem had kept people who are skilled in the field not using polyoxyalkylene amine to prepare WDPIs. Moreover, no reference had mentioned how to solve the problem without adding solvents in the process of making this kind of WDPIs until the inventors of the present invention utilized a known chemistry—biuretization of urea.

In general, the viscosity of a composition would increase with molecular weight (MW). Biuretization converts urea groups into biuret groups with isocyanates, and biuret will further turn into higher urets (herein called "biuret derivatives", such as tri-uret and tetra-uret) if the isocyanates have enough reactivity toward biuret and its derivatives. This reaction increases the MW of the polyisocyanate composition and results in an expected viscosity buildup. In the present invention, the inventors provide a new kind of WDPIs also made from aliphatic polyisocyanates and polyoxyalkylene amines but without the foreseeable problem. No solvent is required to reduce the viscosity in the preparation of this new kind of WDPIs. The fluidity and water dispersibility of such WDPIs have been surprisingly improved. In addition, the WDPIs according to the present invention are more favorable for use in an aqueous resin as a crosslinking agent, compared with commercial product. Particularly, the aqueous resin adhesives crosslinked with the water dispersible polyisocyanate compositions of the present invention have increased adhesion and heat resistance.

SUMMARY OF THE INVENTION

The present invention relates to a water dispersible polyisocyanate composition bearing urea comprising
(a) an aliphatic polyisocyanate or a mixture of aliphatic polyisocyanates or a mixture of aliphatic polyisocyanates with other polyisocyanates; and
(b) a reaction product of component (a) with component (c) a polyoxyalkylene amine or a mixture of a polyoxyalkylene amine and a polyoxyalkylene alcohol.

The present invention also relates to a water dispersible polyisocyanate composition bearing urea and urea derivatives which is obtained by heating the above composition bearing urea for conducting a subsequent reaction. The subsequent reaction at an elevated temperature can increase the numbers of isocyanate functional groups contained in said composition. The urea derivatives include biuret, triuret and tetrauret, and most of them are biuret.

The present invention further relates to a water dispersible polyisocyanate composition bearing biuret which is obtained by heating the above composition bearing urea for conducting a subsequent reaction, to increase the numbers of isocyanate functional groups contained in said composition.

The present invention another relates to an aqueous resin adhesive which contains the water dispersible polyisocyanate composition of the present invention and an aqueous resin containing active hydrogen reactive groups.

DETAILED DESCRIPTION OF THE INVENTION

Polyisocyanate [Component (a)]

The polyisocyanate used in the present invention is an aliphatic polyisocyanate or a mixture of aliphatic polyisocyanates or a mixture of aliphatic polyisocyanates with other polyisocyanates having an average NCO functionality of about 2 to about 6, preferably about 2.5 to about 4, and an NCO content of about 5% to about 30%, preferably about 10% to about 25%.

In the present invention, suitable aliphatic polyisocyanates include, but are not limited to, isocyanates with following derivatives, such as isocyanurate, biuret, uretdione, urethane, allophanate, carbodiimide, oxadiazinetrione, oxadiazine-1,3-dione-5-imine derivatives and mixtures thereof. The aliphatic polyisocyanates and their preparation processes are known and described in the prior art such as U.S. Pat. No. 4,518,522 and U.S. Pat. No. 4,663,377, the disclosures of which are incorporated by reference. Preferred aliphatic polyisocyanate is isocyanurate derivative, biuret derivative or a mixture thereof, more preferably, HDI trimer, isophorone diisocyanate (IPDI) trimer or HDI/IPDI trimer, or a mixture thereof.

Other polyisocyanates for use in the present invention may be any known and conventionally used in the art, such as aromatic polyisocyanates. Suitable aromatic polyisocyanates include, but are not limited to, 4,4-diphenylmethane diisocyanate (MDI), polymeric MDI, toluene diisocyanate (TDI) uretdione dimer and xylene diisocyanate, and a mixture thereof. The aromatic polyisocyanates and their preparation processes are also known and described in the prior art such as U.S. Pat. No. 4,939,191, the disclosures of which are incorporated by reference.

Polyoxyalkylene Amine [Component (c)]

The polyoxyalkylene amines used in the present invention can be prepared through any known methods. For example, the alkoxylation of suitable initiators with ethylene oxide (EO) or a mixture of EO and propylene oxide (PO) to prepare polyoxyalkylene alcohols, and then conversion of the terminal hydroxyl groups of the polyoxyalkylene alcohols to amino groups. Suitable initiators include, but are not limited to, methanol, ethanol, n-butanol, n-propanol, isopropanol, cyclohexanol, phenol, water, ethylene glycol, diethylene glycol (DEG), propylene glycol, glycerin, 2-butone oxime, aniline, trimethylol propane, and 3-methyl-3-hydroxymethyloxetane.

According to the present invention, the polyoxyalkylene amines have the weight ratio of EO to PO in the range of greater than about 50:50, preferably between about 60:40 and about 95:5, and more preferably between about 70:30 and about 90:10. If the hydrophilic ability of the residual hydrophilic groups contained in the formed aqueous resin adhesive is too strong, the aqueous resin adhesive will have tendency to adsorb too much water in its hydrophilic groups so as to easily result in the hydrolysis of the neighboring urea, urethane, biuret, and allophanate and decrease its adhesive performance. Therefore, in the present invention, introducing a hydrophobic group, i.e., PO, in a proportion corresponding to a hydrophilic groups/hydrophobic groups ratio of greater than about 50:50, preferably between about 60:40 and about 95:5, and more preferably between about 70:30 and about 90:10, to the polyoxyalkylene amine for preparing a water dispersible polyisocyanate composition can provide a suitable prevention of the excessive consumption of the isocyanate groups during mixing of the polyisocyanates with the aqueous resin, and also enhance the initial adhesion by the linkage of the hydrophobic group with amine, hydroxyl, and/or carboxyl groups of the aqueous resin.

The polyoxyalkylene amine used in the present invention can be selected from, but are not limited to, polyoxyalkylene monoamine, polyoxyalkylene diamine, polyoxyalkylene triamine, and a mixture thereof, preferably polyoxyalkylene monoamine and polyoxyalkylene diamine. The molecular weights of the polyoxyalkylene monoamine and polyoxyalkylene diamine are about 500 to about 3000 g/mole, preferably about 600 to about 2500 g/mole, more preferably about 800 to about 2200 g/mole.

The examples of the polyoxyalkylene monoamine that can be used in the present invention include, but are not limited to, JEFFAMINE® M-1000 and JEFFAMINE® M-2070. The examples of the polyoxyalkylene diamine that can be used in the present invention include, but are not limited to, JEFFAMINE® ED-900, JEFFAMINE® ED-2001, and JEFFAMINE® ED-2003. The above JEFFAMINE® series are the products of Huntsman.

In one embodiment of the present invention, the polyoxyalkylene monoamine is of the formula

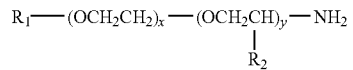

which has a block or random structure, and a number-averaged molecular weight of 600 to 1,050 g/mole; and in which $R_1$ is an alkyl group containing 1 to 4 carbon atoms, $R_2$ is a methyl group or an ethyl group, x/y is from 3.1 to 7.4.

In one embodiment of the present invention, the polyoxyalkylene diamine is of the formula

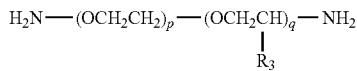

which has a block or random structure, and a number-averaged molecular weight of 1,200 to 2,100 g/mole; and in which $R_3$ is a methyl group or an ethyl group, p/q is from 3.1 to 7.4.

Polyoxyalkylene Alcohol [Component (d)]

The polyoxyalkylene alcohols used in the present invention can be prepared through any known methods, such as by the alkoxylation of suitable initiators with EO or a mixture of EO and PO. The suitable initiators are those mentioned above.

As explicated in the section of polyoxyalkylene amine, in the present invention, the polyoxyalkylene alcohols have the weight ratio of EO to PO in the range of greater than about 50:50, preferably between about 60:40 and about 95:5, and more preferably between about 70:30 and about 90:10.

The polyoxyalkylene alcohol used in the present invention can be selected from, but are not limited to, polyoxyalkylene monol, polyoxyalkylene diol, polyoxyalkylene triol, and a mixture thereof, preferably polyoxyalkylene diol. The molecular weights of the polyoxyalkylene monol, polyoxyalkylene diol, and polyoxyalkylene triol are respectively about 150 to 800 g/mole, preferably about 300 to 500 g/mole; about 300 to 1600 g/mole, preferably about 500 to 1000 g/mole, more preferably about 600 to 800 g/mole; and about 450 to 2400 g/mole, preferably about 600 to 1800 g/mole, more preferably 900 to 1200 g/mole.

Water Dispersible Polyisocyanate Composition

The water dispersible polyisocyanate composition of the present invention can be prepared by any known methods. According to the present invention, the production of reaction product (b) takes place by reacting a polyisocyanate or a mixture of aliphatic polyisocyanates or a mixture of aliphatic polyisocyanates with other polyisocyanates with a polyoxyalkylene amine or a mixture of a polyoxyalkylene amine and a polyoxyalkylene alcohol. Generally, reaction product (b) can either be produced in a separate step by the reaction of a polyisocyanate or a mixture of aliphatic polyisocyanates or a mixture of aliphatic polyisocyanates with other polyisocyanates with a polyoxyalkylene amine or a mixture of a polyoxyalkylene amine and a polyoxyalkylene alcohol, and then mixed with component (a) to form a water dispersible polyisocyanate composition, or it can be produced in situ. The polyisocyanates used to produce reaction product (b) can be either the same or different from component (a) in species.

According to the present invention, it is preferred that reaction product (b) is produced in situ. In other words, the water dispersible polyisocyanate composition is prepared in one pot process where a higher excess of NCO groups contained in component (a) is used to react with component (c).

In this embodiment, component (a) can react with component (c) at a temperature of 20-40° C., for example room temperature, for about 2 to about 4 hours without the presence of a catalyst. Also, in this embodiment, the composition is prepared by reacting about 99.5% to about 92% of component (a) with about 0.5% to about 8% of component (c), preferably about 99% to about 96% of component (a) with about 1% to about 4% of component (c), on the basis of the weight of the composition. If component (c) is a mixture of polyoxyalkylene amines, the polyoxyalkylene amines can be formed by mixing polyoxyalkylene monoamines, polyoxyalkylene diamines, and polyoxyalkylene triamines in any suitable ratios, preferably formed by mixing polyoxyalkylene monoamines and polyoxyalkylene diamines in a ratio of 1:4 to 13:1. If component (c) is mixed with polyoxyalkylene alcohols [component (d)], the composition is prepared by reacting about 99% to about 92% of component (a) with about 0.5% to about 4% of polyoxyalkylene amines and about 0.5% to about 4% of polyoxyalkylene alcohols, on the basis of the weight of the composition. Preferably, the weight ratio of the polyoxyalkylene amines to polyoxyalkylene alcohols is about 1:3 to about 3:1.

If only a polyoxyalkylene amine is used to react with a polyisocyanate, the obtained water dispersible polyisocyanate has a structure of the urea functional group, i.e., a polyisocyanate bearing urea. If a mixture of a polyoxyalkylene amine and a polyoxyalkylene alcohol is used to react with a polyisocyanate, the obtained water dispersible polyisocyanate has structures of the urea and urethane functional groups. Compared with the reaction of a polyoxyalkylene alcohol having a low molecular weight with a polyisocyanate, the use of a polyoxyalkylene amine can extensively reduce the reaction time, even without adding any catalyst to assist the reaction.

The above water dispersible polyisocyanate composition having the structure of the urea functional group of a part of the polyisocyanate can be heated to a temperature of about 100 to about 150° C. for conducting a subsequent reaction for about 1 to about 5 hours. It is well known that the reaction time depends upon the reaction temperature. In the present invention, the temperature is preferably raised to about 110° C. for conducting a subsequent reaction for about 5 hours. Such heating treatment promotes the reaction of the structure of the urea functional group contained in the water dispersible polyisocyanate to form structures of the urea and urea derivatives functional groups. Most, even all, portion of the reaction product obtained by the heating treatment is urea derivatives. The urea derivatives include biuret, triuret, tetrauret, and most of them are biuret.

Therefore, the present invention provides a water dispersible polyisocyanate composition bearing urea, preferably a water dispersible polyisocyanate composition bearing urea and urea derivatives, more preferably a water dispersible polyisocyanate composition bearing urea and biuret, and a water dispersible polyisocyanate composition bearing biuret, which are characterized by being prepared through heating the above water dispersible polyisocyanate composition bearing urea for conducting a subsequent reaction so as to increase the numbers of the isocyanate functional groups contained in the composition.

Regarding the above obtained water dispersible polyisocyanate composition having structures of the urea and urethane functional groups can be similarly heated to a temperature of about 100° C. to about 150° C. for conducting a subsequent reaction for about 1 to about 5 hours, preferably to a temperature of about 110° C. for conducting a subsequent reaction for about 5 hours. The heating can promote the structures of the urea and urethane functional groups contained in the water dispersible polyisocyanate composition to form the structures of urea and urea derivatives and allophanate functional groups. Most, even all, portion of the reaction product obtained by heating treatment is urea derivatives and allophanate. The urea derivatives comprise biuret, triuret, and tetrauret, and most of them are biuret. Therefore, in one embodiment, the present invention provides a water dispersible polyisocyanate composition bearing urea and urea derivatives and allophanate, preferably a water dispersible polyisocyanate composition bearing urea derivatives and allophanate, more preferably a water dispersible polyisocyanate composition bearing urea and biuret and allophanate, and a water dispersible polyisocyanate composition bearing biuret and allophanate. The viscosity of the resulted water dispersible polyisocyanate composition has great relationship with the amount of the polyoxyalkylene amine and its species and molecular weight. Concretely speaking, since urea functional groups easily form hydrogen-bonding with each other, a low molecular weight water dispersible polyisocyanate composition having the structure of the urea functional groups, which is prepared from a low molecular weight polyoxyalkylene amine, has the urea functional groups in a higher concentration, i.e., more pseudo-bondings between the molecules, and exhibits a higher viscosity. If the above composition is treated by heating and the urea functional groups convert to the biuret functional groups, the hydrogen-bonding phenomena is reduced, so that the viscosity of the water dispersible polyisocyanate composition is decreased by up to 25% to 300%. When the polyoxyalkylene diamine is used, the viscosity can be decreased by up to 3000%. The decrease range depends upon the species of the polyoxyalkylene amine and its molecular weight and added amount.

In one embodiment, the present invention provides a water dispersible polyisocyanate composition comprising (a) an aliphatic polyisocyanate or a mixture of aliphatic polyisocyanates bearing primary and/or secondary isocyanate groups, and containing isocyanurate groups, and/or biuret groups, and/or oxadiazine-1,3-dione-5-imine groups, and/or uretdione groups; and (b) a polyoxyalkylene or a mixture of polyoxyalkylenes containing 65-87% of ethylene oxide units, based on a number-averaged molecular weight of the polyoxyalkylene; wherein at least 70 mole % of the polyoxyalkylene are connected to component (a) via biuret groups; and the composition is prepared by (1) reacting component (a) and (c) polyoxyalkylene amine with amine ($NH_2$) equivalent weight of 600-1,050 gram per equivalent number, selecting from
   (c1) 3-7 wt % of polyoxyalkylene monoamine(s), based on the weight of the composition, or
   (c2) 2-4 wt % of polyoxyalkylene diamine(s), based on the weight of the composition, or
   (c3) 3-7 wt % of a mixture of (c1) and (c2), based on the weight of the composition) wherein a weight ratio of (c1)/(c2) is 5-10/1;

at 20-40° C. to connect the polyoxyalkylene amine(s) to component (a) via urea groups;

(2) heating the mixture of step (1) at a temperature of 100-150° C. for 1-5 hours to convert at least 70 mole % of the urea groups into biuret groups;

or prepared by dropwise adding fore-mentioned component (c) into component (a) at a temperature of 100-150° C. for 30-60 minutes and continuing heating the mixture at the temperature of 100-150° C. for 1-4 hours.

In another embodiment, the present invention provides a water dispersible polyisocyanate composition comprising (a) an aliphatic polyisocyanate or a mixture of aliphatic polyisocyanates bearing primary and/or secondary isocyanate groups, and containing isocyanurate groups, and/or biuret groups, and/or oxadiazine-1,3-dione-5-imine groups, and/or uretdione groups; and (b) a polyoxyalkylene or a mixture of polyoxyalkylenes containing 65-87% of ethylene oxide units, based on a number-averaged molecular weight of the polyoxyalkylene; and the composition is prepared by (1) mixing 97-94% of component (a), based on the weight of the composition, with 2-3% of polyoxyalkylene amine (component (c)) with amine ($NH_2$) equivalent weight of 600-1,050 gram per equivalent number, selecting from
   (c1) polyoxyalkylene monoamine(s), or
   (c2) polyoxyalkylene diamine(s), or
   (c3) a mixture of (c1) and (c2);
   and 1-3% of polyoxyalkylene alcohol (component (d)), with hydroxyl (OH) equivalent weight of 300-500 gram per equivalent number, selecting from
   (d1) polyoxyalkylene-diol(s), or
   (d2) polyoxyalkylene triol(s), or
   (d3) a mixture of (d1) and (d2);

at 20-40° C. to connect the polyoxyalkylene amine(s) to component (a) via urea groups;

(2) heating the mixture of step (1) at a temperature of 100-150° C. for 1-5 hours to convert at least 70 mole % of the urea groups into biuret groups, and to connect the polyoxyalkylene alcohol(s) to component (a) via carbamate groups;

or prepared by dropwise adding fore-mentioned component (c) and component (d) into component (a) at a temperature of 100-150° C. for 30-60 minutes and continuing heating the mixture at the temperature of 100-150° C. for 1-4 hours.

In one embodiment, to further control the viscosity of the water dispersible polyisocyanate composition, an inert organic solvent of low boiling point may be added to the polyisocyanate composition before it is used. The organic solvent can be, but are not limited to, ethyl acetate, acetone, dimethyl ethyleneglycol, methyl ethyl ketone, or a mixture thereof, preferably ethyl acetate, and its added amount is adjusted in order to control the viscosity of the final water dispersible polyisocyanate composition as desired.

Aqueous Resin Adhesive

According to the present invention, combining the water dispersible polyisocyanate composition of the present invention with the aqueous resins may be carried out by using any known stirring means, e.g., mechanical stirring.

Examples of suitable aqueous resins for the production of aqueous resin adhesives of the present invention include those containing active hydrogen reactive groups, such as hydroxyl group, an amino group, a carboxyl group and the like, particularly a hydroxyl and amino group. According to the present invention, preferred aqueous resins are aqueous polyurethanes (PUs), aqueous polyvinyl acetates (PVACs), aqueous polyvinyl alcohols (PVOHs), aqueous hydroxy polyacrylates, and mixtures thereof, preferably aqueous PUs. As for the mixing of the water dispersible polyisocyanate composition and the aqueous resin, the amount of the water dispersible polyisocyanate composition is about 1 to about 5 wt %, preferably about 2 to about 4 wt %, based on the weight of the aqueous resin.

The aqueous resin adhesive according to the present invention is suitable for bonding selected materials of the same or different types, for example, wood, paper, plastics, textiles, leather, and inorganic materials, especially PUs, polyvinyl chlorides (PVCs), and rubbers.

The addition of the water dispersible polyisocyanate composition bearing urea or biuret of the present invention to the aqueous resin causes, in particular, improvements in the adhesive ability and heat resistance. Moreover, the present invention provides significant improved efficacy in the initial adhesion strength between the rubber substrates, compared with the water dispersible polyisocyanate compositions formed from polyoxyalkylene alcohols and polyisocyanates.

The following examples serve to explain the invention in more detail. All percentages are percentages by weight unless otherwise indicated.

EXAMPLES

Example 1

The preparation of water dispersible polyisocyanate compositions by using a polyoxyalkylene monoamine or diamine, or a mixture of polyoxyalkylene monoamine and diamine.

General Procedures: HDI trimer, prepared by trimerizing HDI and having a viscosity of about 3000 cps/25° C. and a NCO % of about 21 to 22% (commercially available from Bayer Corp., Rhodia Chimie or BASF Aktiengesellschaft), was added to a reactor and mechanically stirred with a Teflon bar. Polyoxyalkylene amine, as listed in Table 1, was then slowly added to the reactor at room temperature for about 30 minutes. The mixture was denoted as A. A portion of mixture A (about 300 g) was heated to 110° C. and reacted under the temperature for 5 hours, and then was cooled to room temperature. The heat-treated mixture was denoted as B.

TABLE 1

| Polyoxyalkylene amine | EO/PO molar ratio | Number-averaged MW (g/mole) |
|---|---|---|
| Monoamine | | |
| MA-1 | 32/10 | 2000 |
| MA-2 | 19/3 | 1000 |
| Diamine | | |
| DA-1 | 39.5/5 | 2000 |

The amounts of HDI trimer and polyoxyalkylene amines for the production of water dispersible polyisocyanate compositions, and the NCO % and viscosities of the obtained water dispersible polyisocyanate compositions are shown in Table 2.

TABLE 2

| Sample Entry | Starting materials | Ratios in wt % | Ratios in equivalents | Added amounts (g) | Reaction temp. | NCO % | Viscosity (cps/° C.) |
|---|---|---|---|---|---|---|---|
| 1A | HDI trimer | 93.13 | 138.83 | 279.4 | RT | 19.55 | 2,600/ |
|    | MA-1       | 6.87  | 1      | 20.6  |    |       | 31.1 |
| 1B | HDI trimer | 93.13 | 138.83 | 279.4 | 110° C. | 19.36 | 3,100/ |
|    | MA-1       | 6.87  | 1      | 20.6  |    |       | 31.2 |
| 2A | HDI trimer | 93.13 | 69.42  | 279.4 | RT | 18.38 | 53,360/ |
|    | MA-2       | 6.87  | 1      | 20.6  |    |       | 27.5 |
| 2B | HDI trimer | 93.13 | 69.42  | 279.4 | 110° C. | 17.57 | 4,950/ |
|    | MA-2       | 6.87  | 1      | 20.6  |    |       | 27.5 |
| 3A | HDI trimer | 95    | 97.33  | 285   | RT | 19.15 | 7,000/ |
|    | MA-2       | 5     | 1      | 15    |    |       | 27.5 |
| 3B | HDI trimer | 95    | 97.33  | 285   | 110° C. | 18.94 | 2,338/ |
|    | MA-2       | 5     | 1      | 15    |    |       | 27.5 |
| 4A | HDI trimer | 97    | 165.56 | 291   | RT | 19.76 | 26,850/ |
|    | MA-2       | 3     | 1      | 9     |    |       | 27.5 |
| 4B | HDI trimer | 97    | 165.56 | 291   | 110° C. | 19.02 | 5,640/ |
|    | MA-2       | 3     | 1      | 9     |    |       | 24.7 |
| 5A | HDI trimer | 97    | 165.56 | 291   | RT | 21.61 | 120,000/ |
|    | DA-1       | 3     | 1      | 9     |    |       | 27 |
| 5B | HDI trimer | 97    | 165.56 | 291   | 110° C. | 19.19 | 4,122/ |
|    | DA-1       | 3     | 1      | 9     |    |       | 27 |
| 6A | HDI trimer | 98    | 251.67 | 294   | RT | 21.91 | 107,600/ |
|    | DA-1       | 2     | 1      | 6     |    |       | 27 |
| 6B | HDI trimer | 98    | 251.67 | 294   | 110° C. | 21.68 | 3,932/ |
|    | DA-1       | 2     | 1      | 6     |    |       | 27 |
| 7A | HDI trimer | 93.13 | 694.17 | 279.4 | RT | 19.18 | 2,940/ |
|    | MA-1       | 6.183 | 4.5    | 18.54 |    |       | 29.4 |
|    | DA-1       | 0.687 | 1      | 2.06  |    |       |    |
| 7B | HDI trimer | 93.13 | 694.17 | 279.4 | 110° C. | 18.95 | 4,060/ |
|    | MA-1       | 6.183 | 4.5    | 18.54 |    |       | 29.5 |
|    | DA-1       | 0.687 | 1      | 2.06  |    |       |    |
| 8A | HDI trimer | 93.13 | 694.17 | 279.4 | RT | 20.34 | 22,680/ |
|    | MA-2       | 6.183 | 9      | 18.54 |    |       | 27.5 |
|    | DA-1       | 0.687 | 1      | 2.06  |    |       |    |
| 8B | HDI trimer | 93.13 | 694.17 | 279.4 | 110° C. | 17.17 | 4,890/ |
|    | MA-2       | 6.183 | 9      | 18.54 |    |       | 27.5 |
|    | DA-1       | 0.687 | 1      | 2.06  |    |       |    |

RT: room temperature

Example 2

The preparation of water dispersible polyisocyanate compositions by using a mixture of polyoxyalkylene amine and polyoxyalkylene diol.

The preparation procedures were as those described in Example 1, except that a mixture of polyoxyalkylene amine and Diol-1 were reacted with HDI trimer. Diol-1 is commercially available from Eu Hou Polymer Chemical Industry Co., Ltd and has an EO/PO mass ratio of about 80/20 and a number-averaged molecular weight of about 700 g/mole. The amounts of HDI trimer, MA-2, DA-1, and Diol-1 for the preparing water dispersible polyisocyanate compositions, and the NCO % and viscosities of the obtained water dispersible polyisocyanate compositions are shown in Table 3.

TABLE 3

| Sample number | Starting materials | Ratios in wt % | Ratios in equivalents | Added amounts (g) | Reaction temp. | NCO % | Viscosity (cps/° C.) |
|---|---|---|---|---|---|---|---|
| 9A | HDI trimer | 96 | 493.33 | 288 | RT | 20.34 | 2,780/ |
|  | MA-2 | 1 | 1 | 3 |  |  | 27.5 |
|  | Diol-1 | 3 | 8.57 | 9 |  |  |  |
| 9B | HDI trimer | 96 | 493.33 | 288 | 110° C. | 19.93 | 3,672/ |
|  | MA-2 | 1 | 1 | 3 |  |  | 27.5 |
|  | Diol-1 | 3 | 8.57 | 9 |  |  |  |
| 10A | HDI trimer | 95 | 243.33 | 285 | RT | 20.13 | 2,720/ |
|  | MA-2 | 2 | 1 | 6 |  |  | 27.5 |
|  | Diol-1 | 3 | 4.28 | 9 |  |  |  |
| 10B | HDI trimer | 95 | 243.33 | 285 | 110° C. | 19.56 | 2,920/ |
|  | MA-2 | 2 | 1 | 6 |  |  | 27.5 |
|  | Diol-1 | 3 | 4.28 | 9 |  |  |  |
| 11A | HDI trimer | 96 | 493.33 | 288 | RT | 19.66 | 3,120/ |
|  | DA-1 | 1 | 1 | 3 |  |  | 28.5 |
|  | Diol-1 | 3 | 8.57 | 9 |  |  |  |
| 11B | HDI trimer | 96 | 493.33 | 288 | 110° C. | 19.38 | 4,722/ |
|  | DA-1 | 1 | 1 | 3 |  |  | 28.5 |
|  | Diol-1 | 3 | 8.57 | 9 |  |  |  |
| 12A | HDI trimer | 95 | 243.33 | 285 | RT | 19.88 | 5,400/ |
|  | DA-1 | 2 | 1 | 6 |  |  | 28.5 |
|  | Diol-1 | 3 | 4.28 | 9 |  |  |  |
| 12B | HDI trimer | 95 | 243.33 | 285 | 110° C. | 18.78 | 4,278/ |
|  | DA-1 | 2 | 1 | 6 |  |  | 28.5 |
|  | Diol-1 | 3 | 4.28 | 9 |  |  |  |

RT: room temperature

As shown in Table 2 and Table 3, biuretization of the urea linkages in the water dispersible polyisocyanates would obviously increase the viscosity of the mixture except the compositions according to this invention, i.e., sample numbers 2-6, 8, 10, and 12.

Example 3

Adhesion and heat resistance after adhesion tests of the aqueous PU adhesives.

1.5 g of the water dispersible polyisocyanate compositions according to the samples prepared in the above Examples and 1.5 g of a commercial product (Sample C), an aliphatic polyisocyanate free of water, synthesized from HDI trimer and a polyoxyalkylene monol and having an NCO % of 18.5 to 20.5% and a viscosity of 3,000 mPa s/23° C., were respectively added to 48.5 g of aqueous PUs (trade name: GE-6608, manufactured by Great Eastern Resins Industrial Co., Ltd.) to prepare aqueous PU adhesives. Since the aqueous PUs for each test were obtained from different batch preparations, the test results were based on those of Sample C. In other words, the obtained data was for the comparison purpose of the adhesion or heat resistance, rather than an absolute value. The operational procedures for testing the adhesion and heat resistance after adhesion of the aqueous PU adhesive between rubber substrates are as follows:

1. Using a roughening machine to roughen the surfaces of rubber substrates (10 cm×2.5 cm) to be adhered.
2. The surfaces of the rubber substrates were treated with a primer (trade name: GE-001AB, manufactured by Great Eastern Resins Industrial Co., Ltd.).
3. The treated rubber substrates were dried in an oven at 60° C. for 3 minutes.
4. The dried rubber substrates were well applied with an aqueous PU adhesive containing a water dispersible polyisocyanate composition.
5. The coated rubber substrates were further dried in an oven at 60° C. for 5 minutes.
6. Two of the rubber substrates obtained from Step 5 were adhered through the coated surfaces, and then pressed under a pressure of 30 kg for 10 sec.
7. The adhered rubber substrates were statically placed for 10 minutes, and then their initial green strength was tested by using Computer Type Universal Testing Machine.
8. The adhered rubber substrates were statically placed for 1 hour, and then their adhesion was tested by using Universal Testing Machine also.
9. The adhered rubber substrates were statically placed for 24 hours, and then their aging adhesion was tested by using Universal Testing Machine also.
10. The adhered rubber substrates were statically placed for 72 hours, and then placed in an oven of 70° C. and loaded with a mass of 1.5 kg for 60 hours, to test the heat resistance of aging.

Test (A)

The aqueous PU adhesives crosslinked with Sample 3B or C were subjected to the adhesion test according to the above procedures. The test results are shown in Table 4.

TABLE 4

|  | Sample 3B | Sample C |
|---|---|---|
|  | Peel Strength (kg/2.5 cm) | |
| Test Time | | |
| 10 minutes | 14.1 | 12.5 |
| 1 hour | 22 | 20.6 |
| 24 hours | 25.5 | 26 |
| Heat resistance | | |
| Falling time of the mass (min) | No falling occurred | No falling occurred |
| Released distance between the substances (cm) | 0.2 | 0.2 |

According to the test results, the performance of Sample 3B in improving the adhesion of the aqueous PU adhesives exceeded that of Sample C, i.e., the commercial product.

Test (B)

The aqueous PU adhesives crosslinked with Sample 4B or C were subjected to the adhesion and heat resistance tests according to the above procedures. The test results are shown in Table 5.

TABLE 5

|  | Sample 4B | Sample C |
|---|---|---|
|  | Peel Strength (kg/2.5 cm) | |
| Test Time | | |
| 10 minutes | 21 | 16 |
| 1 hour | 28 | 21 |
| 24 hours | 29 | 22 |
| Heat resistance | | |
| Falling time of the mass (min) | No falling occurred | No falling occurred |
| Released distance between the substances (cm) | 0.2 | 0.3 |

According to the test results, the performances of Sample 4B in improving the adhesion and heat resistance after adhesion of the aqueous PU adhesives exceeded those of Sample C, i.e., the commercial product.

Test (C)

The aqueous PU adhesives crosslinked with Sample 5B, 6B, or C were subjected to the adhesion and heat resistance after adhesion tests according to the above procedures. The test results are shown in Table 6.

TABLE 6

|  | Sample 5B | Sample 6B | Sample C |
|---|---|---|---|
|  | Peel Strength (kg/2.5 cm) | | |
| Test Time | | | |
| 10 minutes | 18.5 | 18.5 | 18 |
| 1 hour | 24.5 | 25.5 | 23.5 |
| 24 hours | 24 | 29.5 | 26 |
| Heat resistance | | | |
| Falling time of the mass (min) | No falling occurred | No falling occurred | No falling occurred |
| Released distance between the substances (cm) | 1.4 | 2.2 | 7.5 |

According to the test results, the performances of Samples 5B and 6B in improving the adhesion and heat resistance after adhesion of the aqueous PU adhesives exceeded those of Sample C, i.e., the commercial product.

Test (D)

The aqueous PU adhesives crosslinked with Sample 8B or C were subjected to the adhesion test according to the above procedures. The test results are shown in Table 7.

TABLE 7

|  | Sample 8B | Sample C |
|---|---|---|
| Test Time | Peel Strength (kg/2.5 cm) | |
| 10 minutes | 17 | 17.1 |
| 1 hour | 24.6 | 23 |
| 24 hours | 28 | 23 |

According to the test results, the performance of Sample 8B in improving the adhesion of the aqueous PU adhesives exceeded that of Sample C, i.e., the commercial product.

Test (E)

The aqueous PU adhesives crosslinked with Sample 10B or C were subjected to the adhesion and heat resistance after adhesion tests according to the above procedures. The test results are shown in Table 8.

TABLE 8

|  | Sample 10B | Sample C |
|---|---|---|
|  | Peel Strength (kg/2.5 cm) | |
| Test Time | | |
| 10 minutes | 12 | 8.3 |
| 1 hour | 22.4 | 11.5 |
| 24 hours | 31 | 18 |
| Heat resistance | | |
| Falling time of the mass (min) | No falling occurred | No falling occurred |
| Released distance between the substances (cm) | 1 | 3 |

According to the test results, the performances of Sample 10B in improving the adhesion and heat resistance after adhesion of the aqueous PU adhesives exceeded those of Sample C, i.e., the commercial product.

Test (F)

The aqueous PU adhesives crosslinked with Sample 12B or C were subjected to the adhesion and heat resistance after adhesion tests according to the above procedures. The test results are shown in Table 9.

TABLE 9

|  | Sample 12B | Sample C |
|---|---|---|
|  | Peel Strength (kg/2.5 cm) | |
| Test Time | | |
| 10 minutes | 15.4 | 15.4 |
| 1 hour | 23.8 | 19 |
| 24 hours | 29 | 21.5 |
| Heat resistance | | |
| Falling time of the mass (min) | No falling occurred | No falling occurred |
| Released distance between the substances (cm) | 0.3 | 7.3 |

According to the test results, the performances of Sample 12B in improving the adhesion and heat resistance of the aqueous PU adhesives exceeded those of Sample C, i.e., the commercial product.

It is clearly known from the above data that the aqueous resin adhesives modified by the water dispersible polyisocyanate composition bearing biuret of the present invention indeed provide better adhesive ability and heat resistance, compared with those modified by the current commercial products. Particularly, the aqueous resin adhesives crosslinked with the water dispersible polyisocyanate composition, which is synthesized by using a polyoxyalkylene diamine and a polyoxyalkylene diol in a ratio of about 2:3, provides the most preferred adhesion efficacy, especially a significant increase in both the aging adhesion strength and heat resistance after adhesion.

Although the present invention has been described in detail in the foregoing for the purpose of illustration, it is to be understood that such detail is solely for that purpose and that variations can be made therein by those skilled in this art without departing from the spirit and scope of the present invention except as it may be limited by the claims.

The invention claimed is:

1. A water dispersible polyisocyanate composition having
   (a) an aliphatic polyisocyanate or a mixture of aliphatic polyisocyanates bearing primary and/or secondary isocyanate groups, and containing isocyanurate groups, and/or biuret groups, and/or oxadizine-1,3-dione-5-imine groups, and/or uretdione groups; and
   (b) a reaction product of component (a) with a mixture of a polyoxyalkylene amine and a polyoxyalkylene alcohol containing 65-87% of ethylene oxide units, based on a number-averaged molecular weight of the mixture of the polyoxyalkyene amine and polyoxyalkylene alcohol; wherein
   the composition is prepared by the steps of
   (1) forming an intermediate composition comprising urea functional groups by mixing 97-94% of component (a), based on the weight of the compositions, with 2-3% of a component (c) consisting of polyoxyalkylene amine with an $NH_2$ equivalent weight of 600-1,050 gram per equivalent number, selected from the group consisting of
      (c1) polyoxyalkylene monoamine(s),
      (c2) polyoxyalkylene diamine(s), and
      (c3) a mixture of (c1) and (c2);
   and 1-3% of a component (d) consisting of polyoxyalkylene alcohol with an OH equivalent weight of 300-500 gram per equivalent number, selected from the group consisting of
      (d1) polyoxyalkylene diol(s),
      (d2) polyoxyalkylene triol(s), and
      (d3) a mixture of (d1) and (d2); and then
   (2) continuous heating of the intermediate composition under conditions and for a time to convert sufficient of the urea functional groups to biuret functional groups so as to from the water dispersible polyisocyanate with a viscosity that is less than 132% of the viscosity of the intermediate composition.

2. The water dispersible polyisocyanate composition according to claim 1, wherein the aliphatic polyisocyanate is prepared from a diisocyanate selected from the group consisting of 1,6-hexamethylene diisocyanate, isophorone diisocyanate, xylene diisocyanate, and a mixture thereof.

3. The water dispersible polyisocyanate composition according to claim 1, wherein the component (a) contains aromatic polyisocyanate selected from the group consisting of diphenylmethane diisocyanate (MDI), polymeric MDI, toluene diisocyanate (TDI) uretdione dimer, and a mixture thereof.

4. The water dispersible polyisocyanate composition according to claim 1, wherein the polyoxyalkylene monoamine is of the formula;

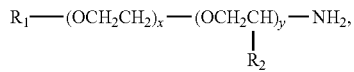

which has a block or random structure, and a number-averaged molecular weight of 600 to 1,050 g/mole; and in which $R_1$ is an alkyl group containing 1 to 4 carbon atoms, $R_2$ is a methyl group or an ethyl group, x/y is from 3.1 to 7.4.

5. The water dispersible polyisocyanate composition according to claim 1, wherein the polyoxyalkylene diamine is of the formula;

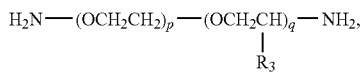

which has a block or random structure, and a number-averaged molecular weight of 1,200 to 2,100 g/mole; and in which $R_3$ is a methyl group or an ethyl group, p/q is from 3.1 to 7.4.

6. The water dispersible polyisocyanate composition according to claim 1, further comprising an inert organic solvent selected from the group consisting of ethyl acetate, acetone, 1,2-dimethoxy ethane, methyl ethyl ketone, and a mixture thereof.

7. An aqueous resin adhesive comprising an aqueous resin and the water dispersible polyisocyanate composition according to claim 1.

8. The aqueous resin adhesive according to claim 7, wherein the water dispersible polyisocyanate composition is in an amount of about 1 to about 5 wt %, based on the weight of the aqueous resin.

9. The aqueous resin adhesive according to claim 8, wherein the water dispersible polyisocyanate composition is in an amount of about 2 to about 4 wt %, based on the weight of the aqueous resin.

10. The aqueous resin adhesive according to claim 7, wherein the aqueous resin is selected from the group consisting of polyurethane, polyvinyl acetate, polyvinyl alcohol, hydroxy polyacrylate and a mixture thereof.

11. The aqueous resin adhesive according to claim 10, wherein the aqueous resin is aqueous polyurethane.

12. The water dispersible composition according to claim 1, wherein the heating in step (2) converts sufficient of the urea functional groups to biuret functional groups so as to form the water dispersible polyisocyanate composition with a viscosity that is lower than the viscosity of the intermediate composition.

13. The water dispersible composition according to claim 1, wherein step (2) comprises heating the intermediate composition at a temperature of 100-150° C. for 1-5 hours to convert at least 70 mole % of the urea functional groups into biuret groups and to connect the polyoxyalkylene alcohol(s) to component (a) via carbamate groups.

14. The water dispersible polyisocyanate composition according to claim 13, wherein the step (2) is at a temperature of 105-115° C. for 3-5 hours.

* * * * *